United States Patent [19]
Ng et al.

[11] Patent Number: 6,163,625
[45] Date of Patent: Dec. 19, 2000

[54] HYBRID IMAGE COMPRESSOR

[75] Inventors: Samson Y. Ng, Newark; Bruce E. Hochuli, Gilroy; David H. Elrod, Sunnyvale, all of Calif.

[73] Assignee: Canon Kabushiki Kaisha, Tokyo, Japan

[21] Appl. No.: 08/967,337

[22] Filed: Oct. 21, 1997

[51] Int. Cl.$^7$ .............................. G06K 9/36; G06K 9/34; B41B 15/00

[52] U.S. Cl. .......................... 382/239; 382/176; 382/173; 395/117

[58] Field of Search ..................................... 382/239, 232, 382/234, 168, 170, 171, 172, 250, 176, 173; 348/404–451, 419; 358/261.2, 430, 500; 395/117

[56] References Cited

U.S. PATENT DOCUMENTS

| | | | |
|---|---|---|---|
| 4,558,302 | 12/1985 | Welch ................................ | 340/347 DD |
| 5,392,362 | 2/1995 | Kimura et al. ........................... | 382/176 |
| 5,539,843 | 7/1996 | Murakami et al. ...................... | 382/173 |
| 5,638,498 | 6/1997 | Tyler et al. .............................. | 395/117 |

OTHER PUBLICATIONS

Chui, C.K., "Wavelets", Wavelet Analysis and Its Applications, vol. 1, Academic Press Inc., Boston, Massachusetts, 1992.

Zoran Corporation, "ZR36050, JPEG Image Compression Processor", Santa Clara, California, Jul., 1996.

Murray, J.D. and vanRyper, W., "JPEG File Interchange Format", Encyclopedia of Graphics File Formats, pp. 510–515, Sebastopol, CA, 1996.

Murray, J.D. and vanRyper, W., "Data Compression", Encyclopedia of Graphics File Formats, Chapter 9, pp. 153–218, Reading, Massachusetts, 1996.

Gonzalez, R.C. and Woods, R.E., "Image Compression", Digital Image Processing, pp. 307–407, Chapter 6, 1992.

Yuval Fisher (editor); "Fractal Image Compression Theory and Application"; Springer–Verlag New York, Inc. 1995 (Corrected second printing 1996).

"Information technology–Digital compression and coding of continous–tone still images: Requirements and quidelines"; pp. ii–182; Reference No. ISO/IEC 10918–1:1994(E).

"Terminal Equipment and Protocols for Telematic Services"; ITU–T Telecommunication Standardization Sector of ITU; ITU–T Recommendation T.82; 1993.

"Pixel Magic PM–2m Multi–Function Image Processor"; pp. 1–4; http://www.pixelmagic.com/pm2m.htm, US.

*Primary Examiner*—Thomas D. Lee
*Assistant Examiner*—Wenpeng Chen
*Attorney, Agent, or Firm*—Fenwick & West LLP

[57] ABSTRACT

A source image (101) consisting of more than one type of image is efficiently compressed. The source image (101) is divided into regions, and each region is assigned to one image type. Separate images (105) based on each image type are constructed from those regions belonging to that image type. These separate images (105) are compressed using schemes optimized for the image type. Later these compressed images are decompressed and reassembled into a reproduction (108) of the original source image (101).

27 Claims, 2 Drawing Sheets

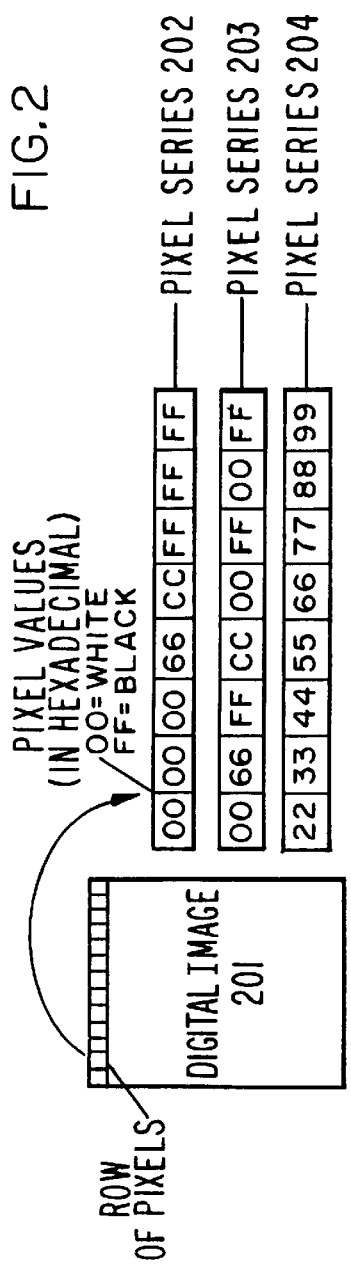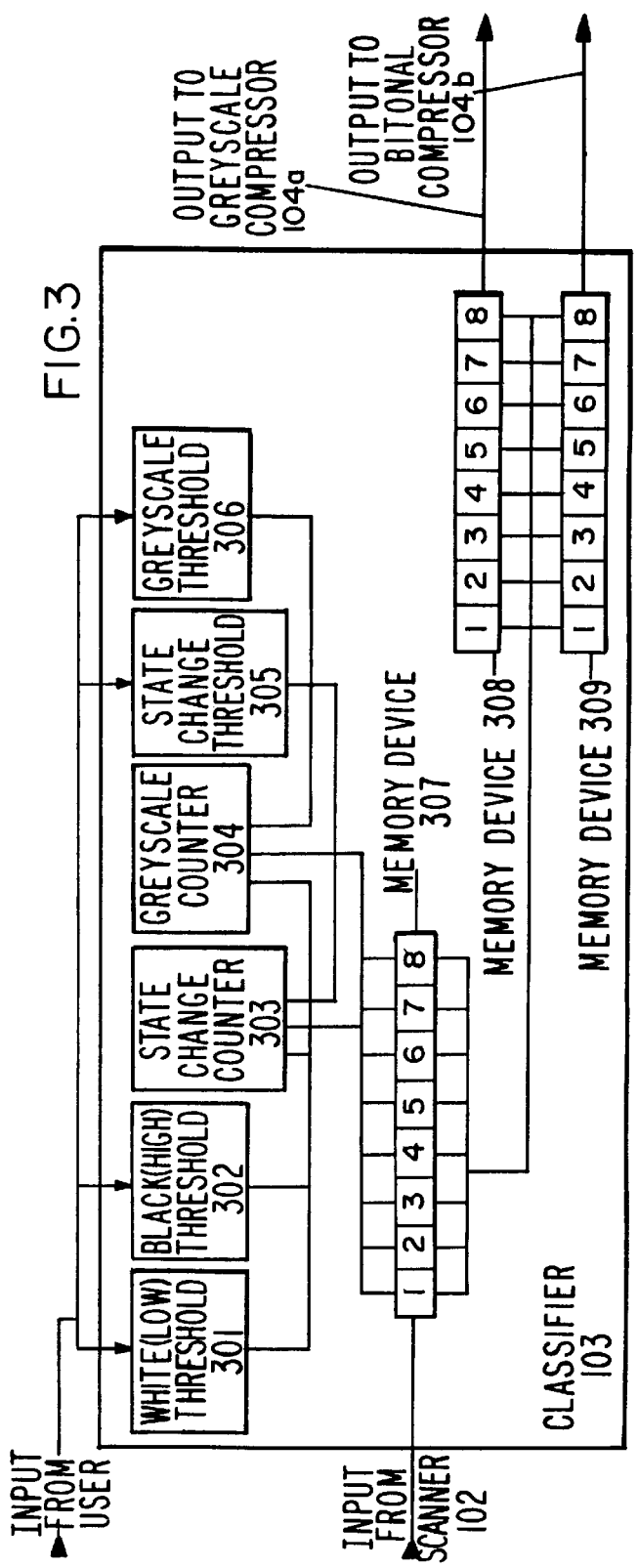

HYBRID IMAGE COMPRESSOR

CROSS-REFERENCE TO RELATED APPLICATION

This application is related to U.S. patent application Ser. No. 08/955,217 for "Image Discriminator", filed on the same day as the present application, and having the same assignee as the present application. The disclosure of the related application is incorporated herein by reference.

BACKGROUND OF THE INVENTION

1. Field of the Invention

The present invention relates generally to digital image compression systems, and more particularly to a system and method of compressing a document containing multiple types of images with compression schemes optimized for the characteristics of separate regions.

2. Description of Background Art

The archiving of documents has long been an important task in many business enterprises and other organizations. Recently, the archiving of digital images of documents has become possible, with affordable document scanners and fast computers. Retaining the full uncompressed digital image of documents, however, leads to difficulties with storage and efficient transmittal across networks. For this reason, most digital document archives employ some sort of compression scheme to decrease the amount of memory required for a single digital document image.

A number of techniques are used to compress digital images, and they generally fit into two broad categories: lossy and lossless. Lossy techniques allow some image data to be lost in the process of compression, while with lossless techniques there is no loss of image data. With lossless techniques the decompressed image is identical to the original. Compression techniques tend to be optimized for specific types of images. One of the image types is "grayscale," meaning that an image is composed of many different shades of gray. A typical grayscale image is a "black and white" photograph of a real world scene, in which the shading of objects is characterized by subtle changes from white to light gray to dark gray to black. Grayscale images are a special case of "continuous tone" images. Continuous tone images contain many colors, but only those colors which are on a gradient between two distinct colors. A continuous tone image could, for example, be composed entirely of color gradations ranging from green to yellow. In the case of grayscale images, the two distinct colors are black and white, with the colors in the image being some combination of black and white. Most instances of non-grayscale continuous tone images are found in images created by graphic artists, such as in some magazine advertisements. Another type of image is referred to as "bitonal." A bitonial image is composed entirely of two distinct colors. The most commonly seen example of bitonal images is probably black text on white paper. Bitonal images are characterized by sharp contrasts, for example the edges of the letters on a printed page. Yet another type of image is the "full color" image. Full color images contain a large number of very different color values, as in a color photograph of a real world scene. A full color image is similar to the continuous tone images, in that it is characterized by smooth variations in color, but the colors are not limited to those on a gradient between two distinct colors. In a typical magazine or newspaper page multiple types of images are present: the photographs and artwork tend to be continuous tone or full color, and the text tends to be bitonal. An image which is composed of more than one type of image is referred to as a "hybrid image."

For the compression of continuous tone and full color images, maximum compression with acceptable results can generally be achieved with lossy compression schemes, such as the Joint Photographic Experts Group (JPEG) standard. This standard is described in J. D. Murray and W. VanRyper, *Encyclopedia of Graphics File Formats*, Second Edition, O'Reilly & Associates, Inc., Bonn:1996 and ISO/IEC 10918–1:1994, *Information Technology—Digital Compression and Coding of Continuous-tone Still Images: Requirements and Guidelines*. The loss of image information in lossy schemes such as JPEG does result in the loss of some image detail. After decompression, however, the result of a JPEG compression performed on most grayscale and full color images is an image which appears to the human eye to be nearly identical to the original. When JPEG (or other lossy compression schemes) are applied to bitonal images, such as a page of text, the results are poor. The sharpness of the characters suffers and the text appears fuzzy. Other loosy compression schemes include fractal compression, described in Yuval Fisher, ed., *Fractal Image Compression: Theory and Application to Digital Images*, Springer Verlag, New York, 1995; and wavelet compression, described in C. K. Chui, *An Introduction to Wavelets*, Academic Press, London, 1992.

Bitonal images are generally compressed with a lossless scheme, in order to preserve the sharpness of the image. Many lossless schemes are specifically optimized for bitonal images and do not handle grayscale and full color images well. Examples of such schemes are the Joint Bilevel Imaging Group (JBIG) standard, described in International Telecommunication Union Recommendation T.82; and the Group 3 and Group 4 standards (G3 and G4) of the 1-D Consultative Committee of the International Telephone and Telegraph (CCITT). These schemes are described in *Encyclopedia of Graphics File Formats* and R. C. Gonzalez & R. E. Woods, *Digital Image Processing*, Addison-Wesley, Reading, Mass.: 1992. While these standards result in significant compression of bitonal images without loss of detail, they perform poorly on grayscale and full color images, sometimes even resulting in negative compression (i.e., larger files).

When scanning and compressing images containing more than one type of image, as in a typical magazine or newspaper page, a tradeoff must be made. If lossy techniques are utilized, the image quality of the text portion of the page suffers, and if lossless techniques are utilized, less compression is achieved. What is needed is a way to maximize compression of hybrid images without loss of detail in the bitonal portions.

DISCLOSURE OF INVENTION

The present invention is a computer apparatus and method for efficiently compressing hybrid images without unacceptable loss of image detail. A hybrid digital image is sent to a classifier (103), which categorizes portions of the image based on a number of image types. The classifier produces multiple images (105a, 105b) which are each sent to a compressor (104a, 104b). Each image contains image data corresponding to one image type. Each compressor is optimized to compress images of the type sent to it, so each region in the original image is efficiently compressed. The individual compressed images can be stored and efficiently transmitted, then reconstructed, producing an image that retains that image detail that is necessary.

BRIEF DESCRIPTION OF THE DRAWINGS

FIG. 2 is an illustration of typical pixel values found within the rows of a hybrid digital image containing both grayscale and bitonal portions.

FIG. 3 is a block diagram showing registers and memory devices contained within one embodiment of the classifier from FIG. 1.

DETAILED DESCRIPTION OF THE PREFERRED EMBODIMENTS

Figure 1:
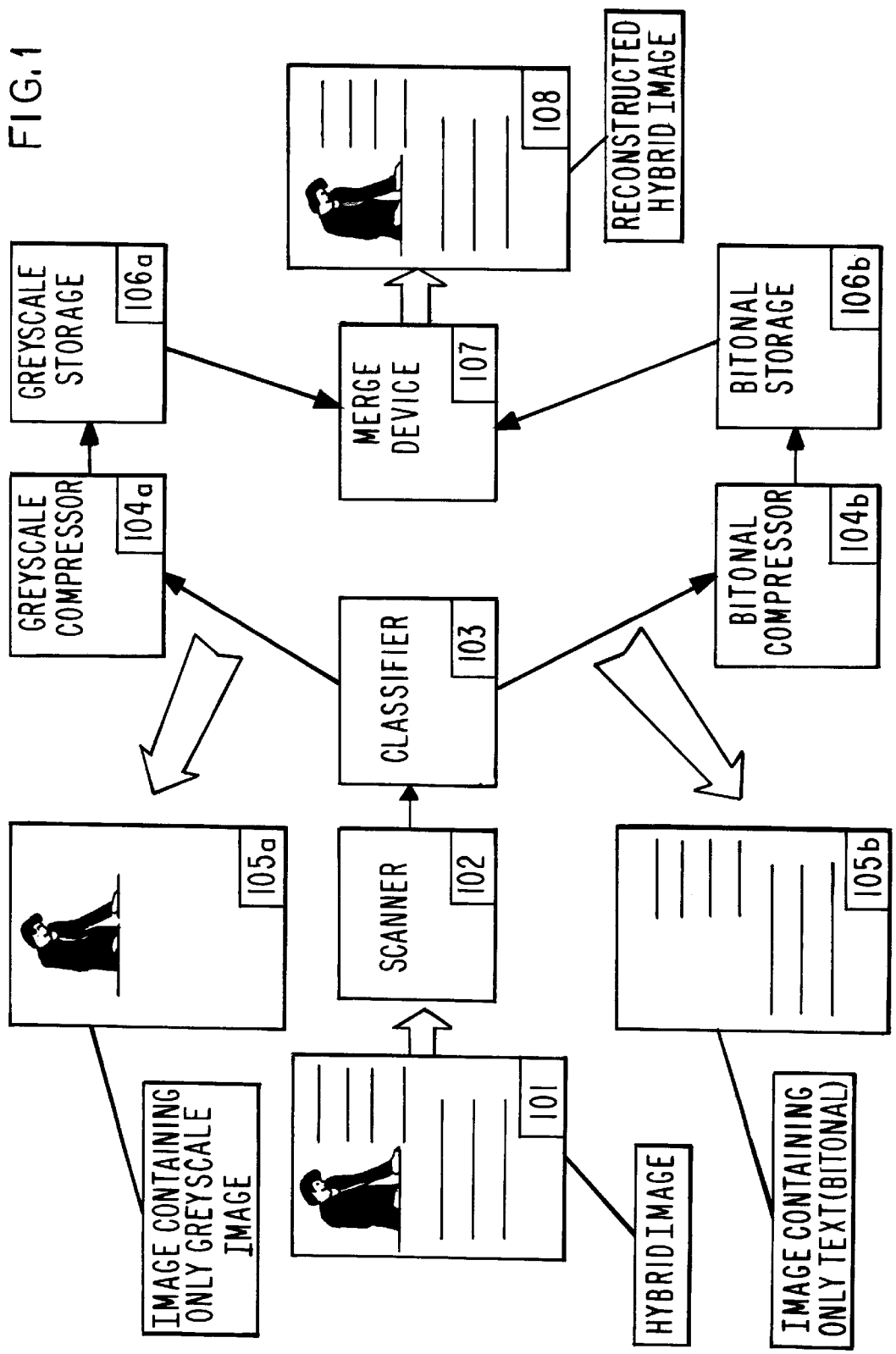
FIG. 1 is a block diagram depicting the operation of the present invention.

The present invention may be implemented as functional components of a scanning system, or may take the form of hardware, software, firmware or some combination thereof. In one embodiment, illustrated in FIG. 1, the present invention is part of a scanning system. For the purposes of this discussion, the operation of the invention will be described in relation to a hybrid image containing grayscale and bitonal portions only. This is for illustrative purposes only and in alternative embodiments other image types, such as full color, continuous tone and motion images, may be used.

Document 101 is a piece of paper containing a hybrid image on it. This particular hybrid image is composed of both grayscale portions and text portions. Alternatively, the document 101 could contain a hybrid image that is composed of other types, such as full color images, moving images and others.

Document 101 is scanned by scanner 102, a conventional device that uses optical means to produce a digital image from an image on a piece of paper.

The digital output of scanner 102 is input to classifier 103, which may be implemented in either hardware, software or firmware. In one embodiment classifier 103 receives input from the scanner one horizontal row of pixels at a time. Classifier 103 performs operations on this row of pixels and then forwards a row of pixels to each compressor 104. Alternatively, classifier 103 could wait for more than one row of pixels, perhaps the entire image, before performing the classification operations. Waiting for more than one row of pixels would allow the classifier 103 to perform more complex operations on the pixel data, but at the price of waiting until the scanner is finished with the entire page. In cases where speed and economy are important, it is preferred that the classifier 103 examines pixels one row at a time, independently of other rows of pixels. This allows the classifier 103 to work while scanning is proceeding and reduces the need for memory to store multiple scan-lines.

When a row of pixels comes into classifier 103, they are divided into groups of eight pixels. The JPEG compression scheme performs its operations on square regions of N pixels by N pixels, with N most commonly being eight. Because at least some of the pixels will be forwarded, after processing by the classifier 103, to JPEG compressor 104a it is advantageous to operate on the pixels in groups of N, in this case groups of eight. Each group of eight horizontal pixels is categorized as being either grayscale or bitonal. Alternatively, other classifications could be used as well.

The classifier 103 must determine whether the series of eight pixels represents a grayscale series or a bitonal series. A typical grayscale series of pixel values is shown in FIG. 2 as series 202. The values (shown in hexadecimal) correspond to the brightness of the given pixel in the image, with 00 being white and FF being black. In series 202 there is a gradual rise from value 00 (white) to value FF (black). This is typical of the pixels in a grayscale image. One way to discriminate between grayscale and bitonal pixel series is to determine the ratio of grayscale pixels to bitonal pixels. To do this, pixels below a particular threshold, for example 10, are considered white, pixels above another threshold, for example EF, are considered black, and all pixels with values in between the thresholds are considered gray. The gray pixels (in this example those with values from 10 to EF) are considered grayscale, while those which are white (from 00 to 0F) and those which are black (F0 to FF) are considered bitonal. Such a scheme is effective on a pixel series like 202, where there is a single rise in pixel values, but is less effective on a pixel series like 203. Series 203 has the same pixel values as series 202, but in a different order. The ratio of grayscale pixels to bitonal pixels is the same in series 202 and series 203. While series 202, with its two transitions from white to gray and gray to black, might well be considered bitonal, series 203, with its several sharp changes between black, gray and white probably would not.

In order to more accurately determine the type to which a pixel series belongs, a state change counter is utilized by the classifier 103. Two "states" are define for the pixels, based on their values: a bitonal state (including black pixels and white pixels), and a gray state (including gray pixels). In FIG. 3 the classifier 103 is seen to include six registers. Register 301 is the "low threshold," the value below which a pixel is determined to be white. Register 302 is the "high threshold," the value above which a pixel is determined to be black. Register 303 is the "state change counter," which is reset to zero by the classifier before a pixel series is analyzed, and incremented by one each time a pixel is encountered which is of a different state than the previous pixel (i.e., a gray pixel is encountered immediately following a white pixel, or a black pixel is encountered immediately following a gray pixel). Register 304 is the "grayscale counter," which is reset to zero by the classifier before a pixel series is analyzed, and incremented by one each time a pixel is encountered which is of the gray state. Register 305 is the "state change threshold." After all eight pixels have been analyzed, the state change counter 303 is compared to the state change threshold 305. If the value in the state change counter 303 exceeds the value in the state change threshold 305, the series of pixels is categorized grayscale. A second test is necessary to handle the situation, as in series 204, where all (or nearly all) pixels are grayscale in a particular series. In that case, the state change counter will contain zero, but the grayscale counter will have a large value. To handle this situation, when state change counter 303 does not exceed the state change threshold 305, grayscale counter 304 is compared to register 306, the "grayscale threshold." If the value of the grayscale counter 304 exceeds the value of the grayscale threshold 306, the series of pixels is categorized as grayscale. Only if neither counter exceeds the corresponding threshold is a series of pixels categorized as bitonal. This procedure categorizes a series of pixels as grayscale if either the number of state changes is high, or if the number of grayscale pixels is high. The threshold values in registers 301, 302, 305 and 306 are programmable by the user to optimize the categorization process for a particular input image. For example, if the background of an image is dark, register 301, the low threshold, may be set higher than otherwise.

In another embodiment, the classifier 103 examines the pixel statistics of the series immediately in front of and the series immediately behind a target series. The effects of the pixels ahead of and behind the target pixels can be modified by weighting. Although a larger memory buffer is required in classifier 103 for this embodiment, the accuracy of the classifier will be improved in many cases. Many other implementations of the classifying procedure will be apparent to those skilled in the art.

Memory device 307 holds the series of eight pixels being analyzed, having been received from the scanner 102. If the classification for a series of pixels is grayscale, then grayscale memory device 308 is filled with the values present in memory device 307, and bitonal memory device 309 is filled with zeroes. If, instead, the categorization for a series of pixels is bitonal, then bitonal memory device 308 is filled with the values of memory device 307, and grayscale memory device 307 is filled with zeroes. The classifier 103 then sends the values from grayscale memory device 307 to the grayscale compressor 104*a*, and sends the values from bitonal memory device 308 to the bitonal compressor 104*b*. In this way, each type of compressor 104 receives either pixel series of its own type, or else zeroes. Compressor 104*a* is optimized to compress grayscale images using a scheme such as JPEG. Compressor 104*b* is optimized to compress bitonal images using a scheme such as JBIG, G3 or G4. Because the regions classified as bitonal may contain some grayscale pixels, it is preferable to use a simple thresholding function to set all pixels in a bitonal series to black (FF) or white (00). This permits a more efficient bitonal compression. Each compressor 104 may be implemented either as a hardware, software or firmware module. A hardware implementation of the JPEG compressor is the model #Z36050 image compressor from Zoran. The model #PM2 image compressor from Pixel Magic is a conventional hardware implementation of a compression scheme optimized for bitonal images. The effect of zeroes in the data transmitted to a compressor 104 is that it is given an image 105 in which those portions of the image that the compressor 104 cannot efficiently compress are masked out in white. Since all of the compression schemes can efficiently compress a large white space, each compressor 104 is able to efficiently compress a different part of the image.

Each compressor 104 stores the result of its compression in a storage device 106. The separate compressed images can reside in the storage device until reconstruction of the original image is desired. At that time, merge device 107 calls upon the storage devices 106 for each compressed portion of the hybrid image 101. The merge device decompresses each image retrieved from storage 106 according to the scheme it was compressed with (in this case JPEG for the grayscale compressed image and JBIG, G3 or G4 for the bitonal compressed image). These separate decompressed images are then superimposed upon one another to form the reconstructed hybrid image 108. The reconstructed hybrid image may be printed, displayed on a monitor, or transmitted to another device, among other things. In an alternate embodiment, the compressed images may be transmitted over a computer network directly to a merge device in another location, where the hybrid image is reconstructed.

The above description is included to illustrate the operation of the preferred embodiments and is not meant to limit the scope of the invention. The scope of the invention is to be limited only by the following claims. From the above description, many variations will be apparent to one skilled in the art that would be encompassed by the spirit and scope of the present invention.

What is claimed is:

1. A system for compressing a digital image, the system comprising:
    a classifier disposed to accept a digital image, for classifying regions of the digital image according to predefined criteria for at least two classifications, and producing at least two classified images, each classified image being associated with one classification and consisting of at least two zones, each region of the digital image having a corresponding zone, those zones corresponding to regions which correspond to the associated classification containing data from the digital image and those zones corresponding to regions which do not correspond to the associated classification containing a blank image; and
    at least two compressors coupled to the classifier, each compressor being associated with one of the classifications and being disposed to accept from the classifier a classified image corresponding to the associated classification, for applying to the classified image a compression procedure adapted to the associated classification and producing a classified compressed image based thereon.

2. The system of claim 1, further comprising:
    a scanner coupled to the classifier, for accepting a document containing a source image, producing a digital image based thereon, and sending the digital image to the classifier.

3. The system of claim 1, wherein the classifier is disposed to accept the digital image from a computer program.

4. The system of claim 1, further comprising:
    at least one storage device coupled to the compressors and disposed to accept the classified compressed images, for storing the classified compressed images.

5. The system of claim 4, further comprising:
    a merge device coupled to the storage device, disposed to retrieve the classified compressed images from the storage device, for constructing a substantial reproduction of the digital image by decompressing each classified compressed image.

6. The system of claim 1, further comprising:
    at least one information transmission device coupled to the compressors and disposed to accept the classified images, for transmitting the classified compressed images to another location.

7. The system of claim 6, further comprising:
    a merge device coupled to the information transmission device, disposed to receive the classified compressed images from the information transmission device, for constructing a substantial reproduction of the digital image by decompressing each classified compressed image.

8. The system of claim 1, wherein one classification is a continuous tone classification.

9. The system of claim 1, wherein one classification is a full color classification.

10. The system of claim 1, wherein one classification is a grayscale classification.

11. The system of claim 1, wherein one classification is a bitonal classification.

12. The system of claim 8, wherein:
    the compression procedure applied by the compressor associated with the continuous tone classification is selected from the group consisting of JPEG, fractal, and wavelet compression schemes.

13. The system of claim 9, wherein:
    the compression procedure applied by the compressor associated with the full color classification is selected from the group consisting of JPEG, fractal, and wavelet compression schemes.

14. The system of claim 10, wherein:
    the compression procedure applied by the compressor associated with the grayscale classification is selected from the group consisting of JPEG, fractal, and wavelet compression schemes.

15. The system of claim 11, wherein:
the compression procedure applied by the compressor associated with the bitonal classification is selected from the group consisting of JBIG, G3, and G4 compression schemes.

16. The system of claim 1, wherein the digital image received by the classifier comprises a plurality of pixels corresponding to a subset of pixels from a larger digital image.

17. A system for reconstructing a digital image containing several regions, the system comprising:
at least one storage device containing at least two classified compressed images, each classified compressed image containing zones corresponding to all the regions of the digital image; and
a merge device coupled to the storage device, disposed to retrieve the classified compressed images, for constructing a substantial reproduction of the digital image by decompressing each classified compressed image and superimposing the decompressed classified images.

18. A method for compressing digital images, the method comprising the steps of:
classifying regions of a digital image according to predefined criteria for at least two classifications;
producing at least two classified images, each classified image being associated with one classification and consisting of at least two zones, each region of the digital image having a corresponding zone, those zones corresponding to regions which correspond to the associated classification containing data from the digital image and those zones corresponding to regions which do not correspond to the associated classification containing a blank image; and
compressing each classified image by applying to the classified image a compression scheme adapted to the classification associated with the classified image, to produce at least two classified compressed images.

19. The method of claim 18, wherein the digital image comprises a plurality of pixels, and wherein the step of classifying regions of the digital image according to predefined criteria for at least two classifications comprises the steps of:
dividing the pixels of the digital image into regions of predetermined size;
determining as a first number for each region the number of pairs of adjacent pixels in the region for which each pixel corresponds to a different classification;
determining as a second number for each region the number of pixels in the region corresponding to a particular classification; and
classifying each region with reference to the first number for that region, the second number for that region, a predetermined first threshold corresponding to the first number, and a predetermined second threshold corresponding to the second number.

20. The method of claim 18, further comprising the step of:
storing each classified compressed image in a storage device.

21. The method of claim 20, further comprising the steps of:
retrieving the classified compressed images from the storage device;
decompressing the classified compressed images, producing classified images therefrom; and
constructing a substantial reproduction of the digital image from the classified images.

22. The method of claim 18, further comprising the step of:
transmitting each classified compressed image to another location.

23. The method of claim 22, further comprising the steps of:
receiving the classified compressed images after transmission;
decompressing the classified compressed images, producing classified images therefrom; and
constructing a substantial reproduction of the digital image from the classified images.

24. The method of claim 23, wherein the digital image comprises a plurality of pixels, and wherein the step of classifying regions of the digital image according to predefined criteria for at least two classifications comprises the steps of:
dividing the pixels of the digital image into regions of predetermined size;
determining as a first number for each region the number of pairs of adjacent pixels in the region for which each pixel corresponds to a different classification;
determining as a second number for each region the number of pixels in the region corresponding to a particular classification; and
classifying each region with reference to the first number for that region, the second number for that region, a predetermined first threshold corresponding to the first number, and a predetermined second threshold corresponding to the second number, wherein the predetermined first threshold and the predetermined second threshold are programmable.

25. A method of reconstructing a digital image containing several regions, the method comprising the steps of:
retrieving classified compressed images from at least one storage device, each classified compressed image containing zones corresponding to all the regions of the digital image;
decompressed the classified compressed images, producing classified images therefrom, each classified image containing a data portion corresponding to a portion of the digital image; and
superimposing the classified images to construct a substantial reproduction of the digital image.

26. A computer readable medium containing a computer program that compresses digital images by performing the steps of:
classifying regions of a digital image according to predefined criteria for at least two classifications;
producing at least two classified images, each classified image being associated with one classification and consisting of zones, each region of the digital image having a corresponding zone, those zones corresponding to regions which correspond to the associated classification containing data from the digital image and those zones corresponding to those regions which do not correspond to the associated classification containing a blank image; and
compressing each classified image by applying to the classified image a compression scheme adapted to the classification associated with the classified image, to produce at least two classified compressed images.

27. A computer readable medium containing a computer program that reconstructs a digital image containing several regions, by performing the steps of:

retrieving at least two classified compressed images from at least one storage device, each classified compressed image containing zones corresponding to all the regions of the digital image;

decompressing the classified compressed images, producing classified images therefrom, each classified image containing a data portion corresponding to a portion of the digital image; and superimposing the classified images to construct a substantial reproduction of the digital image.

* * * * *

UNITED STATES PATENT AND TRADEMARK OFFICE
CERTIFICATE OF CORRECTION

PATENT NO. : 6,163,625

DATED : December 19, 2000

INVENTORS : Samson Y. Ng, Bruce E. Hochuli, and David H. Elrod

It is certified that error appears in the above-identified patent and that said Letters Patent is hereby corrected as shown below:

In column 8, line 41, delete "decompressed" and insert --decompressing--.

Signed and Sealed this

First Day of May, 2001

Attest:

NICHOLAS P. GODICI

Attesting Officer　　　Acting Director of the United States Patent and Trademark Office